Figure 1:
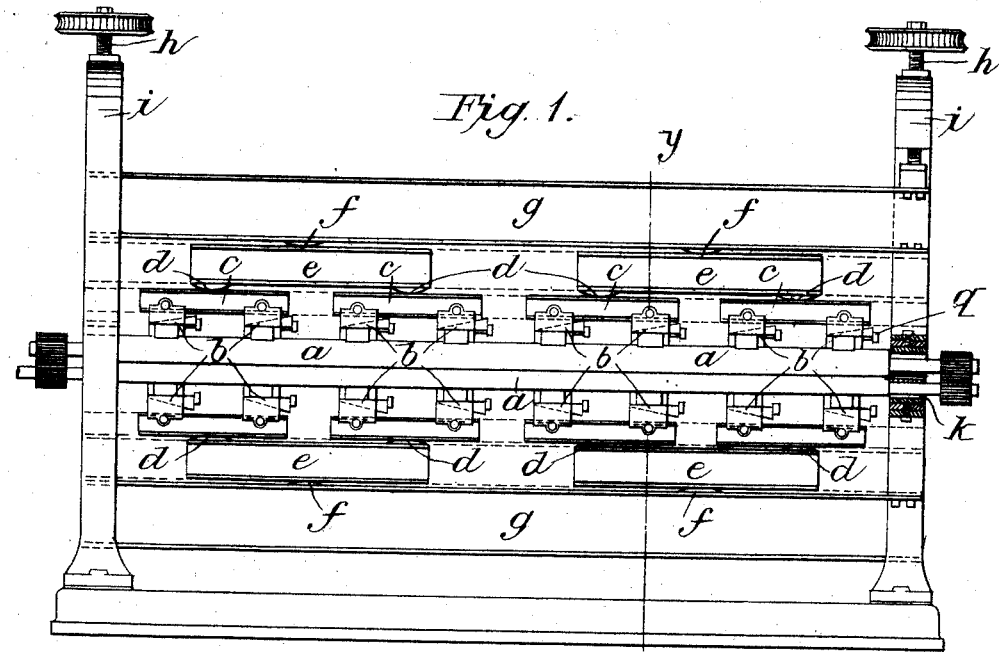

No. 864,660. PATENTED AUG. 27, 1907.
W. LOVE.
PRESSURE ROLLER.
APPLICATION FILED NOV. 12, 1906.

5 SHEETS—SHEET 1.

Witnesses
Inventor
William Love
by Hubut & Week Attorney

No. 864,660. PATENTED AUG. 27, 1907.
W. LOVE.
PRESSURE ROLLER.
APPLICATION FILED NOV. 12, 1906.
5 SHEETS—SHEET 2.
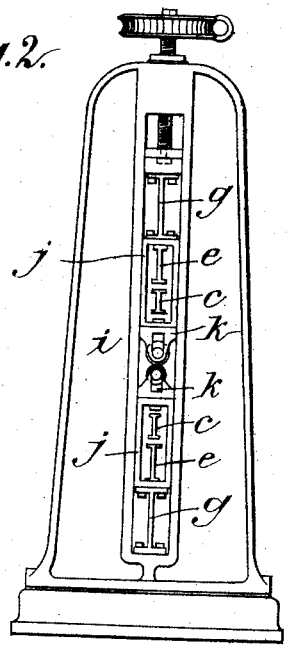
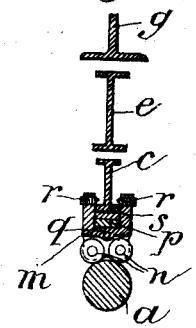
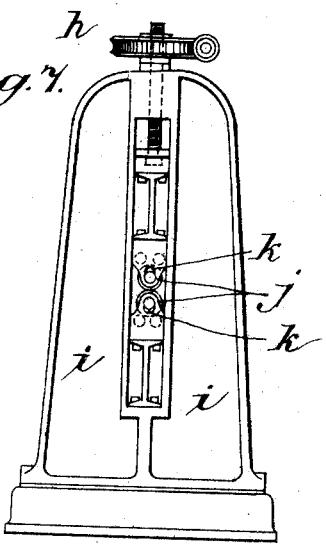
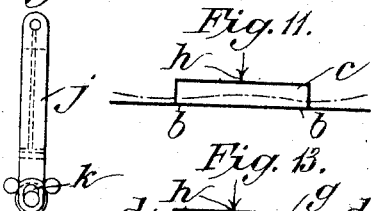
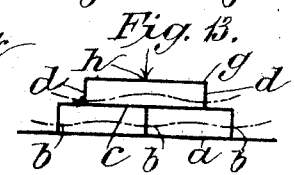
Witnesses
C. P. Wright Jr.
E. R. Peck
Inventor
William Love
by Hubert C. Peck
Attorney

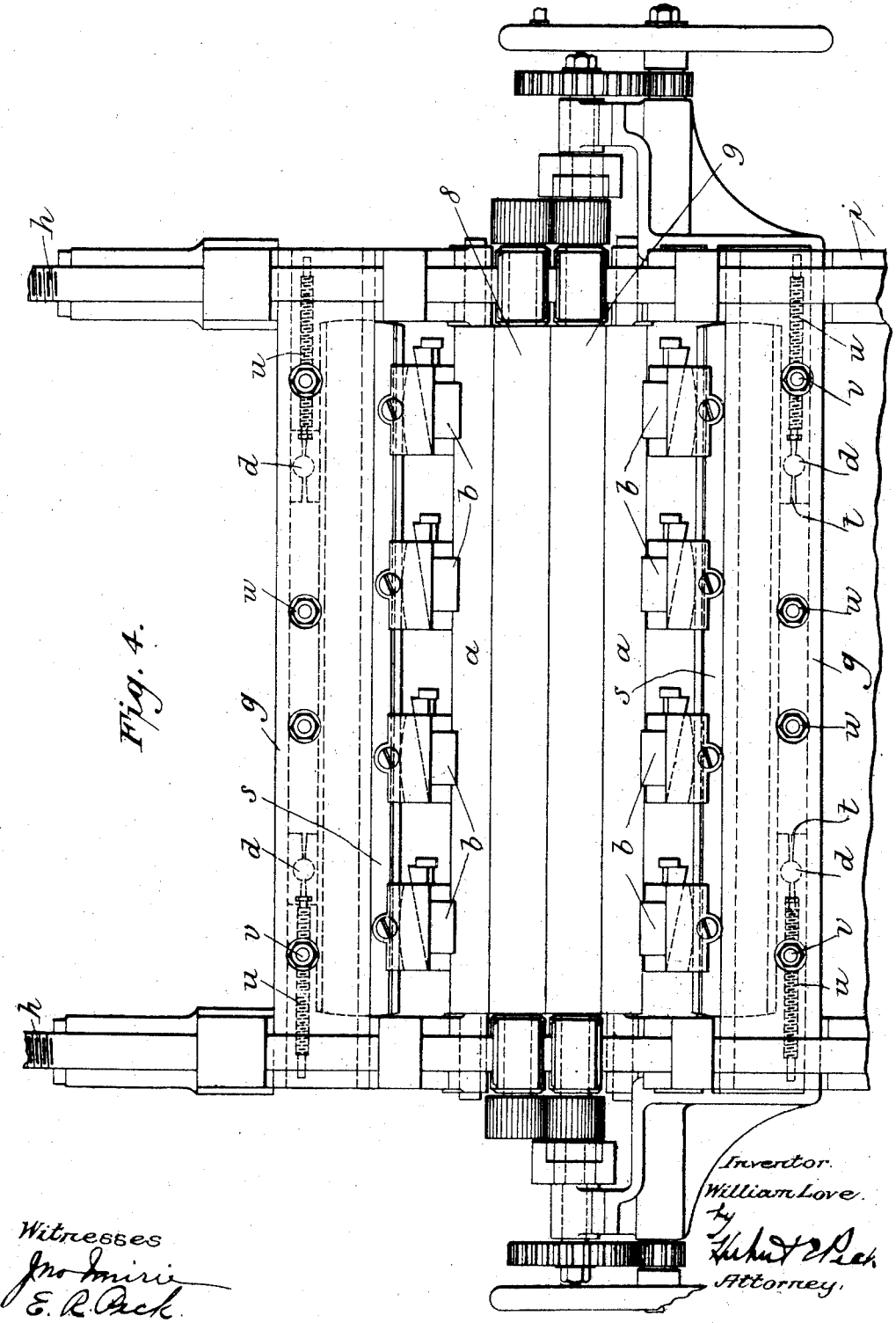

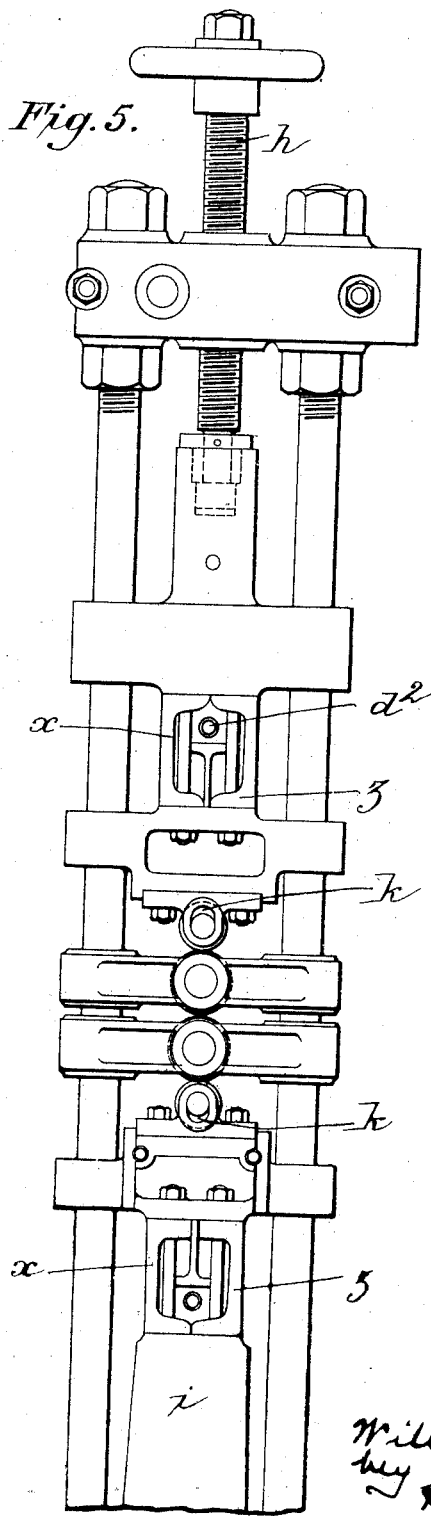

No. 864,660. PATENTED AUG. 27, 1907.
W. LOVE.
PRESSURE ROLLER.
APPLICATION FILED NOV. 12, 1906.
5 SHEETS—SHEET 5.
Fig. 14.
Fig. 17.
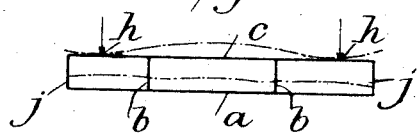
Fig. 16.
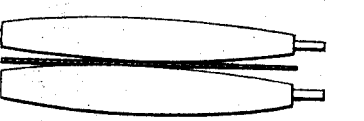
Fig. 19.
Fig. 18.
Fig. 10.
Fig. 12.
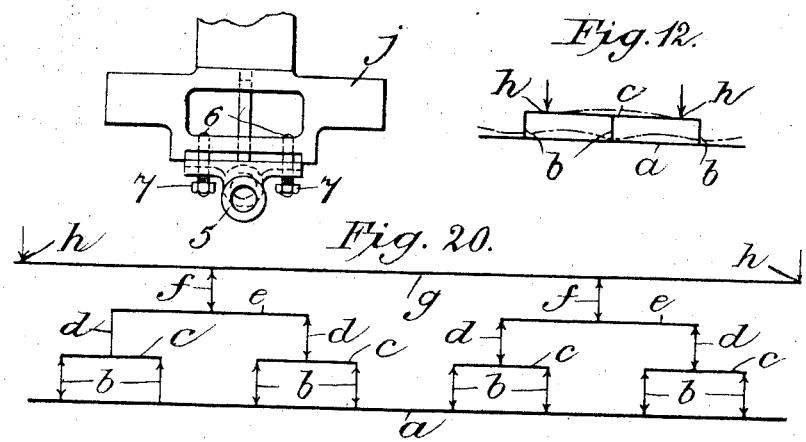
Fig. 20.
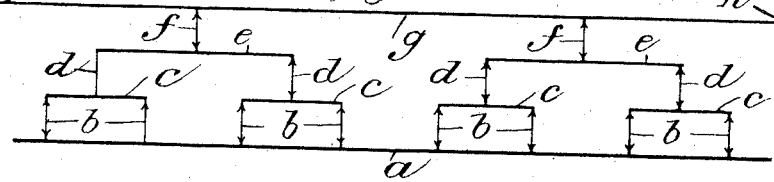
Fig. 21.
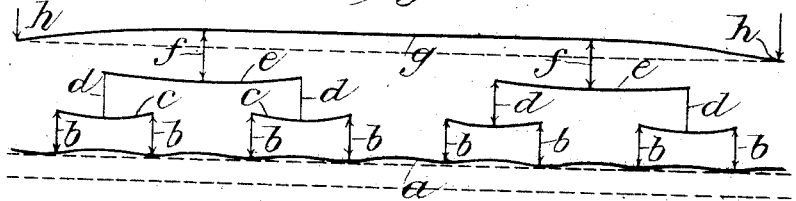
Fig. 15.
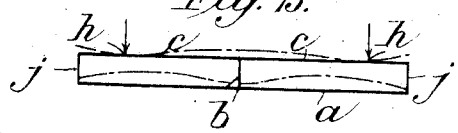
Witnesses
C. R. Wright Jr.
E. R. Peck
Inventor
William Love
by Hubert Peck
Attorney

UNITED STATES PATENT OFFICE.

WILLIAM LOVE, OF LONDON, ENGLAND.

PRESSURE-ROLLER.

No. 864,660.

Specification of Letters Patent.

Patented Aug. 27, 1907.

Application filed November 12, 1906. Serial No. 343,124.

*To all whom it may concern:*

Be it known that I, WILLIAM LOVE, a subject of the King of Great Britain and Ireland, residing at London, England, have invented Improvements Pertaining to Pressure-Rollers, of which the following is a specification.

This invention relates to rollers for exerting pressure. It has for objects to avoid or minimize the deflection of such rollers; to enable truly cylindrical or "parallel" rollers to be employed in lieu of cambered rollers and thereby to obtain a uniform peripheral velocity from end to end of a roller and also to avoid the expensive and uncertain operation of cambering; further to enable rollers of much smaller diameter than heretofore usual to be employed for the transmission of given pressures; to enable such rollers to preserve substantially their axial straightness from the instant of contact to the instant of maximum pressure; and to provide means for regulating the resistance of a roller at any desired point of its length, as may be required by the exigencies of the work to be performed. To accomplish these objects I provide a roller with a bearing or bearings at one or more intermediate points of its length and so arranged as to oppose the load on the roller.
The bearing or bearings is or are mounted on a girder or beam or on two or more girders or beams which may be considered as springs and are in some cases levers of equal arms. The beam or beams bears or bear against an abutment or abutments, which, in order that a load uniformly distributed along the roller may meet with equal resistances at the bearings, is or are so arranged that it or each of them becomes the center of equilibrium of the load on two corresponding bearings so that the deflection of the spring at the corresponding two bearings will be equal so that the movement of the bearings under their load will also be equal. As no more than two bearings can fulfil this condition in respect to any one abutment and as it is frequently desirable to employ more than two intermediate bearings, in order to extend the construction I provide the abutments in such cases on a further beam or girder or further beams or girders which in like manner is or are provided with an abutment or abutments, and so on. The final abutment or each final abutment is in some cases formed by an ordinary pressure screw.

The girder or the final girder in some cases is a simple beam and in other cases a compound girder, the form of the girder depending upon the strength required and the room at disposal.

In some cases the beam or girder or final beam or girder is provided at its ends with links or bars adapted to engage the ends of the roller so that by means of the pressure screw or screws the roller can be withdrawn as well as caused to exert pressure, and the roller, its bearings, and its beam or girder or beams or girders are connected together to form a single unit. The links or bars in some cases are slotted so that they will not act as struts upon the roller and in other cases they are provided with bearings for acting as struts thereon. In other cases the beam or girder or final beam or girder is not so connected to its roller at its ends but it is sometimes provided at its ends with bearings adapted to act as abutments against the ends of the roller.

In some cases instead of having no more than two bearings to each beam or girder a single beam or girder is employed in lieu of two or more beams or girders arranged as above described and is thus provided with three or more intermediate bearings; the position of an abutment in relation to its bearings may then differ somewhat from that hereinbefore described. Each intermediate bearing may be (particularly in the case just mentioned) provided with means for adjusting its bearing surface in relation to the beam or girder. These means may comprise a wedge arranged to be adjusted in relation to the bearing.

Each bearing sometimes consists of a support having mounted in it, to form its bearing surface, a pair of rollers adapted to bear upon the main roller.

The beam or girder or final beam or girder sometimes bears against two abutments equidistant from its bearings or other abutment or abutments.

The invention is illustrated by the accompanying drawings, of which

Figure 6:
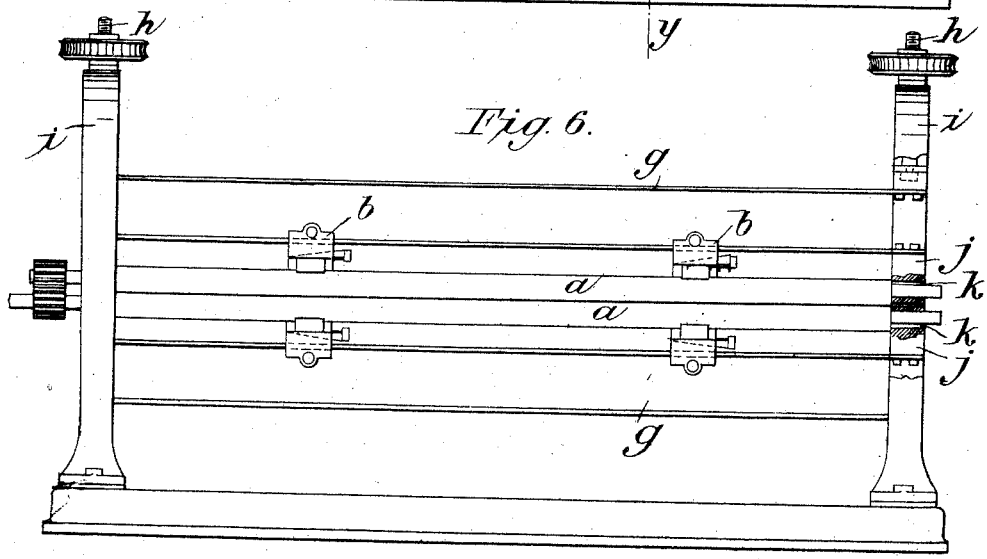
Figure 8:
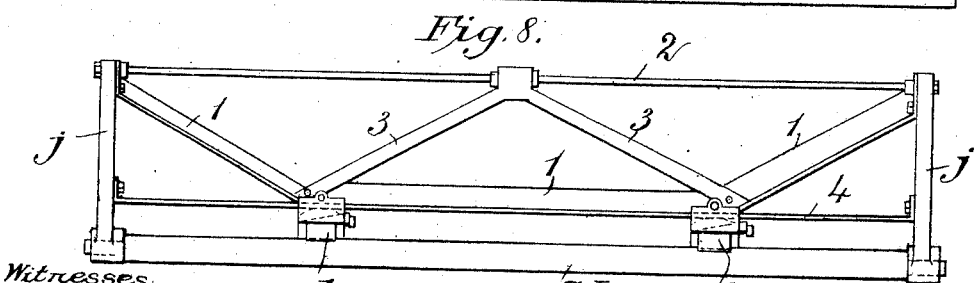

Figures 1, 2, and 3 represent an example of a pair of pressure rollers provided with deflection-minimizing means according to this invention comprising equal-armed levers, Fig. 1 being a sectional elevation and Fig. 2 a side elevation of the machine, and Fig. 3 a cross section of part of the machine corresponding to the line $y$—$y$ of Fig. 1 and drawn to a larger scale than Figs. 1 and 2; Figs. 4 and 5 are front and end elevations of a calendering machine the calendering rollers of which are provided with deflection-minimizing means according to this invention; Figs. 6 and 7 are respectively front and end elevations of an example of a different type; Figs. 8 and 9 are respectively a front elevation and an end elevation of another example of the type illustrated by Figs. 6 and 7; Fig. 10 is a partial end view illustrating a modification; and Figs. 11 to 21 inclusive are diagrams hereinafter referred to.

Each of the pressure rollers $a$ in the example shown in Figs. 1, 2, and 3 is provided at intermediate points of its length with eight bearings $b$ which are mounted in pairs on beams $c$ each of which bears against an abutment $d$ on a further beam $e$, which, again, is provided with an abutment $f$ on a final beam $g$. The upper final beam $g$ is provided at its ends with two ordinary pressure screws $h$ which engage in the ordinary manner in the end standards $i$ of the machine; and the upper girder $g$ is also provided at its ends with links $j$ which are adapted to engage the ends of the corresponding roller $a$ so that by means of the pressure screws $h$ the roller $a$ can be withdrawn as well as caused to exert pressure, and the roller $a$, its bearings $b$, and its beams $c$, $e$, and $g$ are connected together to form a single unit. The links $j$ are formed with slots $k$ where they engage the roller $a$ so that they will not act as struts upon the roller but will allow the whole of the pressure to be exerted upon the roller by the bearings $b$. The lower beam $g$ has for abutments simply the end standards $i$ of the frame; it is similarly provided with links $j$ having slots $k$ in which the ends of the corresponding roller $a$ engage. Each bearing $b$ in the example described consists (Fig. 3) of a block $m$ having mounted in it a pair of rollers $n$ which directly bear upon the pressure roller $a$. The bearing surface of each bearing $b$ can be adjusted in relation to its beam or girder $c$ and transversely to the roller $a$ by means of a wedge $p$ which by means of a set-screw $q$ can be advanced or withdrawn under the inclined surface $s$ of a block which fits in a recess in the block $m$ so as to be prevented from moving longitudinally therein and the upper surface of which forms a segment of a cylinder of large diameter and bears against the beam $c$. The rollers $n$ of each bearing are, by means of their convex surfaces $s$, enabled to retain a perfectly parallel contact notwithstanding want of parallelism between the corresponding beam $c$ and the roller $a$, which may be caused by the flexure of the beam of equal arms $c$; set-screws $r$ are provided in the sides of the block $m$ to bear against the upper face of the lower flange of the beam $c$. In the case of apparatus in which the beams $c$ are equal-armed levers, as shown, this facility of adjustment is useful in bringing the bearings $b$ of the several beams $c$ into exact alinement in setting up the apparatus. The bearings $b$ of each beam $c$ are at equal distances from the abutment $d$ thereof, and the abutments $d$ of each beam $e$ are likewise at equal distances from its abutment $f$; furthermore, the abutments $f$ are equidistant from the ends of the corresponding beams $g$ and therefore from the bases of the standing beams $g$ and from the pressure screws $h$ respectively. Consequently a load between the rollers $a$ and uniformly distributed along them will occasion equal resistances at the bearings $b$, so that, except for local bending of the roller $a$ between adjacent bearings $b$ or at the ends of the roller beyond the bearings $b$, which may, by suitably proportioning the diameter of the roller and the number of the bearings to the load on the roller, be reduced to a negligible quantity, the roller $a$ will by the load be moved upwards or downwards, as the case may be, parallel to itself, this parallel motion being allowed by the slots $k$ in the links $j$ in which the rollers $a$ engage. It will be clear that whatever be the pressure exerted upon the roller $a$ by each bearing $b$ this parallelism of position will continue in contradistinction to the case of ordinary pressure rollers, in which the greater the pressure the greater is the bowing of the roller and consequently the more ununiform becomes the thickness of the sheet of material under treatment.

As indicated by dotted lines in Fig. 1, a single beam may be employed in lieu of two or more of the beams $c$ or in lieu of the two beams $e$ of each roller $a$. In this case, however, owing to the fact that the two bearings $b$ nearest to the ends of the roller $a$ will be acting upon cantaliver portions of the single beam employed in lieu of the beams $c$, while the other bearings $b$ will be acting upon portions of that beam in the nature of beams fixed at both ends, the two end bearings $b$ should be nearer to their fulcra $d$ than the adjacent bearings $b$; similarly the abutments $d$ nearest to the ends of the roller $a$ should be nearer to their fulcra $f$ than the other abutments $d$; the precise positions of the bearings $b$ and abutments $d$ for any given beams should be determined by experiment and for this purpose they should be made adjustable along the beams. The substitution of single beams for the several beams $c$ and $e$ respectively possesses the advantage that as the portions of each beam between adjacent abutments $d$ and $f$ respectively then assume the nature of beams fixed at both ends, the beams may be made for a given maximum pressure of less strength than would be required in the case of an arrangement of beams such as shown in full lines in Fig. 1. In apparatus in which a single beam takes the place of two or more equal-armed beams, the facility for adjusting the bearings $b$ transversely to the roller $a$ may be made use of to give ununiform pressures at the bearings $b$. Figs. 4 and 5 show by way of illustration an example in which each pressure roller $a$ is acted upon by four bearings $b$ mounted upon a single beam $s$ which consequently takes the place of two beams $c$ of equal arms and in which means are provided for the adjustment of the fulcra $d$ of the beam $s$ in the manner above indicated; each of the fulcra $d$ is for this purpose provided in a carriage $t$ adapted to be slid along the final girder $g$ by means of a screw threaded spindle $u$ which engages by means of a collar in the carriage $t$ and fits in a correspondingly threaded nut formed by the shank of a bolt $v$, which, with other bolts $w$, also serves for securing together two beams $x$ and $z$ (Fig. 5) of which the girder $g$ is composed. By moving the fulcra $d$ from the position for uniform pressure at the bearings $b$, the bearings $b$ can be caused to exert ununiform pressures upon the roller $a$, which may in some cases be useful; obviously the same effect could be produced by moving the bearings $b$ along the roller $a$ while retaining the position of the fulcra $d$.

In the machine shown in Figs. 6 and 7 each pressing roller is provided with only two intermediate bearings and each beam or girder $g$ is provided with two abutments equidistant from its bearings $b$, the abutments of the upper beam $g$ being constituted by pressure screws $h$ and the abutments of the lower beam $g$ being constituted by the end supports $i$. It will be clear that as the links $j$ with which the girders $g$ are provided are formed with slots $k$ for the engagement of the rollers $a$, in this case also a load between the rollers $a$ and uniformly distributed along them will cause equal movements of the bearings $b$ whatever be the amount of the load and consequently the axial straightness of each roller $a$ from the instant of contact between it and the work to the instant of maximum pressure will be preserved except so far as concerns the local bending between the bearings $b$ and the bending of the end portions of the roller beyond the bearings $b$, which, as has been previously indicated, may be negligible. Since the portion of each roller $a$ between the bearings $b$ may be regarded as a beam fixed at both ends and each of the end portions of the roller beyond the bearings b may be regarded as a cantaliver or beam fixed at one end only, the distance between the bearings b should be somewhat greater than one half of the length of the roller, the precise distance for a given roller being best determined by experiment. I have found about five eighths of the total length of a roller to be a proper distance.

In Figs. 1 and 6 the final girder or the single girder is shown as a single beam. Figs. 8 and 9 show an example in which the single girder is constructed as a compound girder. It comprises three struts 1 formed by a single bar and connected together by a tie 2, and two struts 3 connecting together the central portion of the tie 2 with the junctions between the two inclined struts 1 and the third strut 1, which is parallel to the roller a; also two links or bars j (in which the ends of the roller a engage and which are intended to be acted upon by pressure screws or their equivalents or to bear against fixed abutments) and a bar 4 by means of which the ends of the bars j are kept at the proper distance apart without the assistance of the roller a. The bars j, as shown in Fig. 9, are provided with slots k in which the ends of the roller a engage so that, except for the form of the beam, the arrangement is similar to that shown in Figs. 6 and 7. Obviously various constructions may be employed for the beams.

Fig. 10 shows an alternative to the engagement of the ends of a pressure roller in slots in links or bars for the purpose hereinbefore referred to. In this case each link j comprises a circularly bored bearing 5 which is secured to the body portion of the link by studs 6 along which the bearing 5 can slide to an extent limited by the nuts 7 by means of which the roller can by the links j be moved away from the coöperating roller.

Various ways other than those shown in the figures previously described may be employed in arranging bearings for rollers and abutments for beams according to this invention. Some of these are shown diagrammatically in Figs. 11 to 16 inclusive, in which the various parts are indicated by the same letters as are used in Fig. 1. Fig. 11 shows a simple case of two intermediate bearings b provided on a single beam c, which is acted upon by a single abutment h equidistant from the bearings b, instead of, as in the cases of Figs. 4 and 6, two abutments h on opposite sides thereof. Figs. 12, 13, and 14 represent pressure rollers a each of which has three intermediate bearings b which are provided on a single beam c so that the arrangement may be considered as almost the equivalent of two beams of half the length the two adjacent bearings of which have previously exerted only half the force and have been brought into coincidence; to produce parallel movement of the roller a with uniform load the beam c in each case has its two abutments arranged at equal distances from the middle bearing b but further therefrom than from the outer bearings b so that, when the roller a is uniformly loaded, then whatever force be applied the displacements of the bearings b will be equal notwithstanding the fact that the part of the beam c between the two abutments is of the nature of a beam fixed at both ends whereas the parts of the beam c projecting beyond the abutments are of the nature of cantalivers or beams each of which is fixed at only one end: Fig. 12 shows a simple case in which the abutments acting directly upon the beam c are the final abutments h; while Figs. 13 and 14 represent cases in which the abutments acting directly upon the beams c are intermediate abutments d provided on a final beam g, which according to Fig. 13 has a single abutment h between the abutments d, but according to Fig. 14 has two abutments h on opposite sides of the abutments d. Fig. 15 represents diagrammatically an example of the construction hereinbefore indicated according whereto the links or bars j of a beam or girder are not slotted but are adapted to act as struts upon the roller a; the beam c is provided with a single intermediate bearing b to act upon the roller a and it is furnished with two abutments h which are arranged nearer to the bars j than to the intermediate bearing b so that a load distributed uniformly along the roller a and between it and the coöperating roller will displace the bars j and the bearing b equally whatever be the amount of the load notwithstanding that the part of the beam c between the abutments h is of the nature of a beam fixed at both ends while the parts of the roller c projecting beyond the abutments h are of the nature of cantalivers; the approximate positions of the abutments h are represented in the diagram but their precise positions should be determined by experiment in each particular case. The arrangement shown in Fig. 15, although considerably superior as regards the amount of the deflection of the roller a to the ordinary arrangement wherein the roller has end bearings only, is thought inferior to those shown in Figs. 6 and 8 because in the former case the part of the roller between the bearing b and each of the bars j, though slightly shorter than the distance between the bearings b of Figs. 6 and 8, is of the nature of a beam fixed at one end (b) but merely supported at the other end (j) instead of being of the nature of a beam fixed at both ends. It will be seen that the arrangement (except that the beam is continuous) is the equivalent of two beams of half the length, of which the adjacent bearings, each exerting half the force of the bearing b, have been brought into coincidence. Fig. 16 represents an arrangement in which there are end bearings, at j, and two intermediate bearings b, and a single beam c has two abutments h arranged in a manner analogous to that of those shown in Fig. 15, so that the displacements of the bearings b and the bars j will be equal with a uniform load on the roller a. In all the diagrams, Figs. 11 to 16 inclusive, the deflection of the various parts of the rollers and beams is indicated, with considerable exaggeration, by dotted lines.

It will usually be preferable, on account of the tendency of the bearings b to groove the rollers a, not to employ such rollers directly upon the article or material to be treated but to arrange them in contact with calendar or similar rollers so that they will force the latter against their work as shown in Figs. 4 and 5, which represent a machine in which calendering rollers 8 and 9, of much less diameter than has hitherto been usual, are acted upon by two pressure rollers a provided with deflection-minimizing means according to this invention.

The great advantage possessed by calendering and similar apparatus constructed according to my invention will be clear from Figs. 17, 18 and 19, which illustrate diagrammatically the evils attending the use in the ordinary way of uncambered or "parallel" rollers and of cambered rollers. Fig. 17 shows a pair of uncambered rollers at work and indicates how considerable a difference of thickness may be caused between the middle and the edges of a sheet of material under treatment by the bending of the rollers. Figs. 18 and 19 show a pair of cambered rollers open and at work respectively and it will be clear from then why a specific cambering of the rollers can be correct only for the particular pressure that will produce the bending of the rollers shown in Fig. 19. In the case of apparatus according to my invention, on the other hand, a pair of rollers of much less weight than is usual in such cases can be kept practically straight from the moment of contact to the moment of maximum pressure, as is indicated by Figs. 20 and 21, which are diagrams illustrating the deflection of a roller provided with eight intermediate bearings as shown in Fig. 1; Fig. 20 shows the position of the roller $a$ and its various bearings $b$, beams $c$, $e$, and $g$, and abutments $d$, $f$, and $h$ when the roller is unloaded and Fig. 21 shows the corresponding positions when the roller is fully loaded, the original positions of the roller $a$ and the beam $g$ being indicated by dotted lines and a straight broken line being drawn through the points representing the bearing surfaces of the bearings $b$ to show clearly the deflection of the roller between the bearings $b$ and at the ends of the roller. Some idea of the degree of axial straightness that can be obtained by means of my apparatus may be gathered from a consideration of the formula for the deflection of a beam (or roller) $\frac{WL^3}{KEI}$, where W is the total of a uniformly distributed load on the beam, L its length, K a constant, E the modulus of the elasticity of the beam, and I the moment of inertia of a cross section; it will be seen that with $n$ intermediate bearings and no end bearings the distance between adjacent bearings will be $\frac{1}{n\text{th}}$ of the length of the roller or thereabouts, while the load on each portion of the roller between adjacent intermediate bearings will be $\frac{1}{n\text{th}}$ of the total load on the roller, so that according to the above formula the deflection of such a portion will be only $\frac{(1)^4}{n}$ of the deflection of the roller when provided with end bearings only, and therefore if there were 8 intermediate bearings as shown in Fig. 1 the deflection between adjacent bearings would be only about $\frac{1^4}{(8)}$ or $\frac{1}{4096\text{th}}$ of the deflection of the beam if it had end bearings only.

That roller apparatus according to this invention can be made much lighter for a given pressure than roller apparatus in which the strength of the rollers themselves is depended upon to prevent their excessive deflection, will be seen from the fact that in the latter apparatus not only are the rollers unsuitable in form to be of minimum weight for a given required strength, but the strength required in the rollers very much exceeds the elastic limit corresponding to the load, since it has to be sufficient to prevent even slight deflection, whereas in apparatus according to this invention the strength demanded of the rollers need be sufficient only to prevent such slight deflection between an intermediate bearing and an adjacent bearing or the end of a roller, and, as will be seen from what has been hereinbefore stated, is consequently very much less than would be required were there no intermediate bearing, while the resistance required to prevent excessive general axial deflection is furnished by a beam or beams which not only may be loaded almost to the elastic limit but may also be so formed as to be of minimum weight for the strength required.

What I claim is:—

1. Roller apparatus comprising a pressure roller, bearings arranged so that said roller will be acted upon in opposition to its load and intermediately of its ends, and means for securing that all said bearings will move equally under the action of a load distributed uniformly along said roller notwithstanding variation in the amount of that load.

2. Roller apparatus comprising a pressure roller, bearings arranged so that said roller will be acted upon in opposition to its load and intermediately of its ends, one or more beams or girders on which said bearings are mounted, and means for acting against said beams or girders so that when a load distributed uniformly along said roller is acting thereon said bearings will be moved equally by the portions of the load respectively sustained thereby notwithstanding variation in the amount of said load.

3. Roller apparatus comprising a pressure roller, bearings arranged so that said roller will be acted upon in opposition to its load and intermediately of its ends, one or more beams or girders on which said bearings are mounted, and abutments acting upon said beams or girders between adjacent ones of said bearings and so supported to oppose the pressure on said bearings that when a load distributed uniformly along said roller is acting thereon said bearings will be moved equally by the portions of the load respectively sustained thereby notwithstanding variation in the amount of said load.

4. Roller apparatus comprising a pressure roller, bearings arranged in pairs so that said roller will be acted upon in opposition to its load and intermediately of its ends, beams or girders on which said pairs of bearings are severally mounted, and for each of said beams or girders an abutment arranged to be the center of equilibrium of the load on the two corresponding bearings.

5. Roller apparatus comprising a pressure roller, bearings arranged in pairs so that said roller will be acted upon in opposition to its load and intermediately of its ends, beams or girders on which said pairs of bearings are severally mounted, for each of said beams or girders an abutment arranged to be the center of equilibrium of the load on the two corresponding bearings, one or more supplementary beams or girders, two abutments provided on the or each last mentioned beam or girder of which each is arranged to be the center of equilibrium of the loads on the two bearings of one of two adjacent ones of the aforesaid beams or girders, to which said or each said supplementary beam or girder corresponds, and an abutment arranged to act upon said or each said supplementary beam or girder and to be the center of equilibrium of the forces acting upon said abutments provided thereon.

6. Roller apparatus comprising a pressure roller, bearings arranged so that said roller will be acted upon in opposition to its load both terminally and intermediately of its ends, and means for securing that all said bearings will move equally under the action of a load distributed uniformly along said roller notwithstanding variation in the amount of said load.

7. Roller apparatus comprising a pressure roller, bearings arranged so that said roller will be acted upon in opposition to its load both terminally and intermediately of its ends, one or more beams or girders on which said bearings are mounted, and means for acting against said beams or girders so that when a load distributed uniformly along said roller is acting thereon said bearings will be moved equally by the portions of the load respectively sustained thereby notwithstanding variation in the amount of said load.

8. Roller apparatus comprising a pressure roller, bearings arranged so that said roller will be acted upon in opposition to its load and intermediately of its ends, a beam or girder, links connecting said beam or girder to the ends of said roller so that said roller can be withdrawn from said load by said beam or girder, and means for enabling said bearings to be acted upon by said beam or girder so that when a load distributed uniformly along said roller is acting thereon said bearings will be moved equally by the portions of the load respectively sustained thereby notwithstanding variation in the amount of said load.

9. Roller apparatus comprising a pressure roller, bearings arranged so that said roller will be acted upon in opposition to its load and intermediately of its ends, beams or girders on which said bearings are mounted, a supplementary beam or girder, means for enabling said supplementary beam or girder to act upon the aforesaid beams or girders so that when a load distributed uniformly along said roller is acting thereon said bearings will be moved equally by the portions of the load respectively sustained thereby notwithstanding variation in the amount of that load, and links connecting said supplementary beam or girder to the ends of said roller so that said roller can be withdrawn from said load by said supplementary beam or girder.

10. Roller apparatus comprising a pressure roller, bearings arranged so that said roller will be acted upon in opposition to its load intermediately of its ends, one or more beams or girders on which said bearings are mounted, means for adjusting the bearing surface of one or each of said bearings in relation to said beams or girders, and means for acting against said beams or girders so that when a load distributed uniformly along said roller is acting thereon said bearings will be moved equally by the portions of the load respectively sustained thereby notwithstanding variation in the amount of said load.

11. Roller apparatus comprising a pressure roller, bearings arranged so that said roller will be acted upon in opposition to its load and intermediately of its ends, one or more beams or girders on which said bearings are mounted, abutments acting upon said beams or girders between adjacent ones of said bearings, and means for adjusting said abutments longitudinally of said roller to cause them to support the pressure on said bearings so that when a load distributed uniformly along said roller is acting thereon said bearings will be moved equally by the portions of the load respectively sustained thereby notwithstanding variation in the amount of said load.

12. Roller apparatus comprising a pressure roller, bearings arranged so that said roller will be acted upon in opposition to its load intermediately of its ends, one or more beams or girders on which said bearings are mounted, means for adjusting the bearing surface of one or each of said bearings in relation to said beams or girders, and means for acting against said beams or girders so that when a load distributed uniformly along said roller is acting thereon said bearings will be moved equally by the portions of the load respectively sustained thereby notwithstanding variation in the amount of said load, the or each bearing comprising a bearing surface, a block having a convex surface in contact with the corresponding beam or girder, a wedge between said block and said bearing surface and adapted to move the latter in relation to the former, and means for preventing longitudinal movement of said block in relation to said bearing surface.

Signed at 42 Claremont Square London N this twenty ninth day of September 1906.

WILLIAM LOVE.

Witnesses:
AUBER CRAWLE PEARSON,
JOHN WILLIAM FRENCH.